United States Patent

[11] 3,590,646

[72] Inventor Fridolin Werner Bredl
Germering, Germany
[21] Appl. No. 852,338
[22] Filed Aug. 22, 1969
[45] Patented July 6, 1971
[73] Assignee Entwicklungsring Sud G.m.b.H.
Munich, Germany
[32] Priority Sept. 13, 1968
[33] Germany
[31] P 17 81 235.0

[54] APPARATUS FOR EXTENDING THE LIFT ENGINES OF A VTOL AIRCRAFT
3 Claims, 4 Drawing Figs.
[52] U.S. Cl. .................................................. 74/89.15,
74/424.8 R
[51] Int. Cl. ...................................................... F16h 3/70
[50] Field of Search............................................ 74/89.15,
424.8; 244/23, 53, 55; 248/5

[56] References Cited
UNITED STATES PATENTS
3,371,545  3/1968  McNeal, Jr. et al........... 74/89.15
3,501,114  3/1970  De Plante..................... 74/89.15 X Primary Examiner—William F. O'Dea
Assistant Examiner—F. D. Shoemaker
Attorney—William K. Serp ABSTRACT: An apparatus for extending the lift engines of a VTOL aircraft from a stowed position within the fuselage to an extended operative position. Each of the engines are supported upon a jackscrew. serving to drive each of the jackscrews is a planetary drive which is actuated by a motor. Each of the planetary drives includes a shaft which is coupled to a universal joint. The universal joints are connected to a bearing. The adjacent ends of the jackscrews are rotatably pinned to levers which coact upon a lost-motion-compensating means. Energizing of the motors results in actuation of the jackscrews which correspondingly produces movement of the engines.

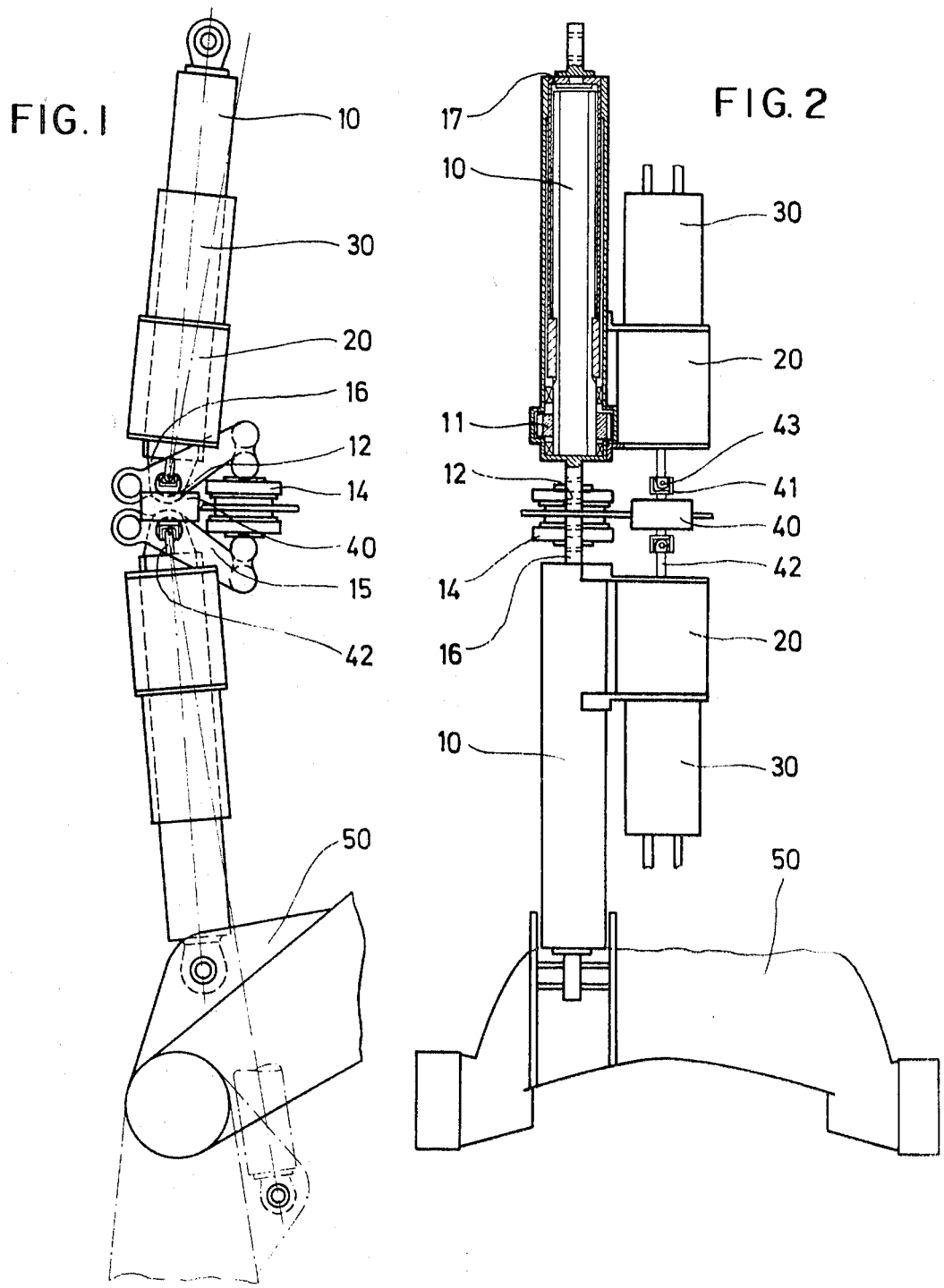

APPARATUS FOR EXTENDING THE LIFT ENGINES OF A VTOL AIRCRAFT

BACKGROUND OF THE INVENTION

This invention relates to a mechanism for extending the lift engines from a stowed position within the airframe of a VTOL/STOL aircraft to an operative position. The invention is especially adapted for use in an arrangement where the engines are located at both sides of the fuselage.

Various means for extending or swinging the engines of an aircraft into an operative position are known wherein each engine or engine pair is provided with a hydraulic cylinder. One particular disadvantage with such arrangements is that a relatively complicated mechanism is required for synchronizing the movements of the engines. The use of tandem cylinders having two hydraulic cylinders at each side has been used in the past. This arrangement creates a stowage problem as a result of the engine lengths involved. Further, such an arrangement also necessitates a considerable supply of oil for the hydraulic operation, greater maintenance expense and the use of additional locks or stops upon the hydraulic cylinders.

It is an object of the present invention to improve upon such known arrangements by eliminating all synchronizing devices and locking apparatus so as to obtain a considerable weight reduction with respect to prior constructions.

In order to accomplish this end, the illustrated embodiment includes a synchroshaft, one end of which is coupled to a universal joint and the remaining end of which is coupled to a planetary drive. A synchroshaft is provided at each side of the aircraft and serves to drive the two jackscrews.

In accordance with the illustrated embodiment, the plane through which the axes of the universal joints lie above the intersection point of the axes of the jackscrews will be subsequently described. This arrangement serves to minimize forces upon the synchroshafts during operation.

With respect to the illustrated embodiment, the jackscrews are connected to a means which serves to compensate for lost motion. This feature assures compensation of the moments occurring in the fuselage when the engines are in their terminal positions, that is, either extended or stowed.

Other objects and advantages of the invention will become apparent with reference to the following description and accompanying drawings which show an illustrated embodiment of this invention.

BRIEF DESCRIPTION OF THE DRAWINGS

FIG. 1 is a plan view of an embodiment incorporating certain features of this invention.

FIG. 2 is a side view partly in section of the apparatus illustrated in FIG. 1.

DESCRIPTION OF THE PREFERRED EMBODIMENTS

Figure 3:
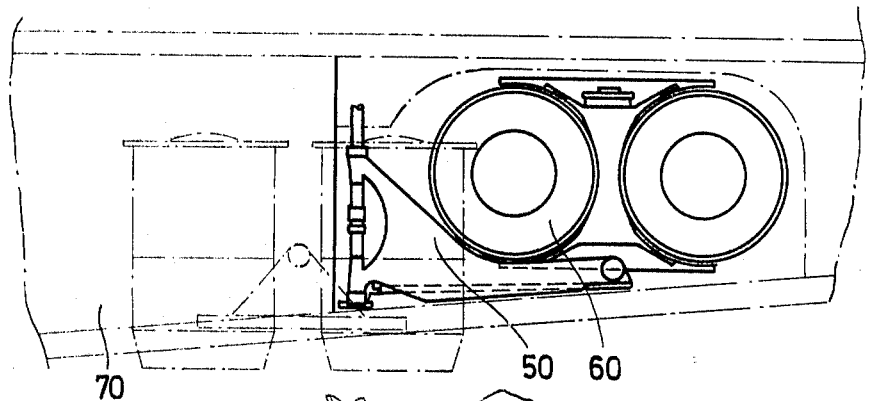
FIG. 3 is a side view of an apparatus including the components illustrated in FIG. 1.
Figure 4:
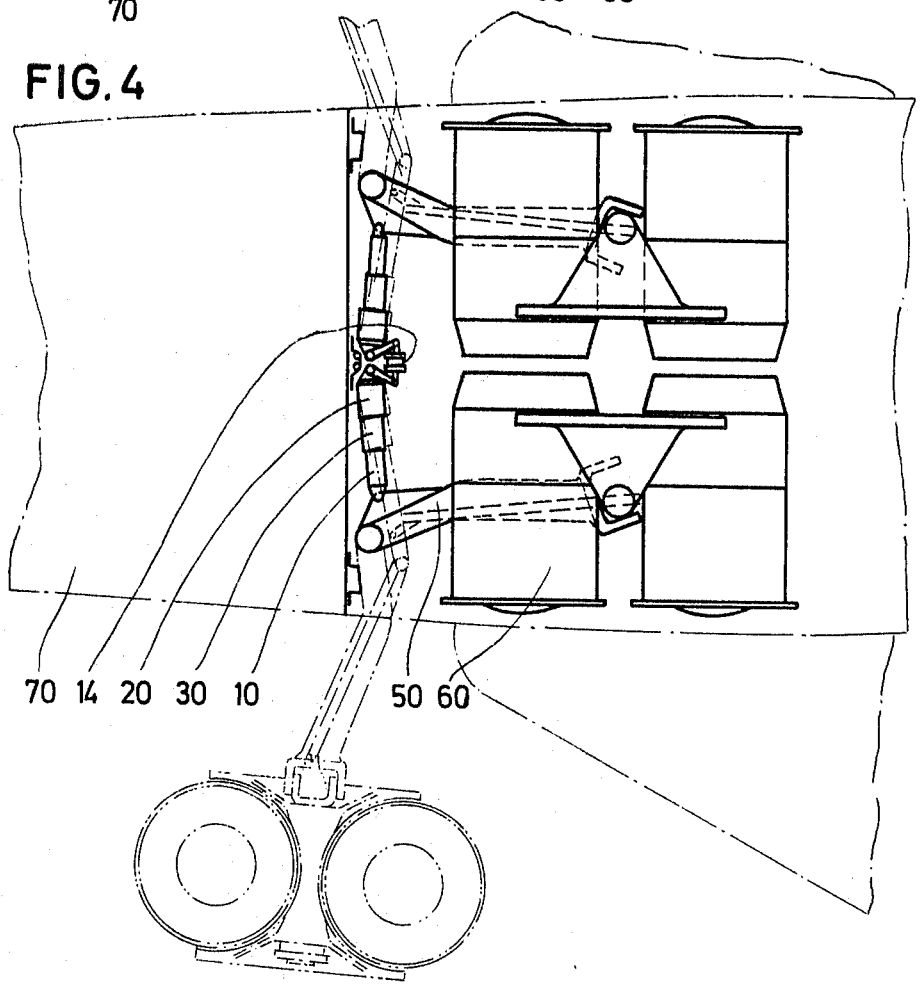
FIG. 4 is a top view of the apparatus illustrated in FIG. 3.

The extending apparatus illustrated includes two jackscrews 10. As particularly illustrated in FIGS. 1 and 2, each of the jackscrews 10 is provided with a motor 30 mounted thereon. Each of the motors 30 are in turn connected to a planetary drive 20. To the ends of the jackscrews 10 are mounted supporting lugs 16 which are in turn pivotably connected to a lever 15. The levers 15 each engage a means which serves to compensate for any lost motion. The axis of rotation of the lever 15 with respect to the lugs 16 is denoted by the numeral 12. Each of the planetary drives engages a ring gear 11 mounted on the jackscrew 10. Rotation of the jackscrew 10 causes an actuator 17, mounted on engine arm 50, to swing outwardly and correspondingly the engines 60 swing out of airframe 70. The jackscrew drive, due to its self-locking feature, permits locking of the engines 60 at any intermediate position during the extending movement. Upon rotation of the ring gear 11, a synchroshaft 42 which is attached to a bearing 40 by means of a universal joint 41 is correspondingly rotated. The same arrangement provided upon the opposite side of the bearing serves to cause corresponding movement of the other engine. Both jackscrews 10 are connected to the lost motion compensating device by means of levers 15. The two planetary drives 20 with their synchroshafts 42 and universal joints 41 assure synchronous operation of the entire extending mechanism.

It should be noted that the mounting and support of both the actuating as well as the synchronizing means be located so that the planes which are normal to the longitudinal axes of the jackscrews 10 and which contain the axis of each of the respective universal joints 41 intersects the jackscrews' axes on opposite sides of the lost-motion-compensating means 14. This arrangement prevents the creation of tensile or bending forces which may occur in the synchroshaft 42. The illustrated arrangement assures that a uniform extension of the engines from both sides of the fuselage will be obtained and additionally prevents instability along the pitch and roll axes during the extending operation.

Additionally, it will be noted that the synchroshafts 42 provide a safety feature. As illustrated, each engine 60 is connected to a separate power system which may be hydraulic or electric as desired. In the event one of the engines fails, the remaining engine will then provide the torque for both sides of the system by means of the coupled synchroshafts 42. In summary, the illustrated embodiment provides a considerable savings in weight and space and reduces maintenance requirements. An important consideration is that it is possible to stop the engines at any point without the necessity of having to lock the mechanism during the extending operation.

Although only one specific embodiment of this invention has been shown and described herein, it will be understood that certain details of the construction shown may be altered without departing from the spirit and scope of this invention.

I claim:

1. An apparatus particularly adapted for extending the lift engines of a VTOL/STOL aircraft comprising a synchroshaft, a universal joint coupled to one end of said synchroshaft, a planetary drive mechanism connected to the remaining end of said synchroshaft, a jackscrew coupled to said planetary drive, the longitudinal axis of said jackscrew being generally parallel to the longitudinal axis of said planetary drive, and a lever mounted upon the end of said jackscrew adjacent said synchroshaft.

2. An apparatus in accordance with claim 1 wherein the axis of said universal joint lies in a plane which normally intersects the axis of said jackscrew between the body of the jackscrew and the lever connected thereto.

3. An apparatus in accordance with claim 1 which further includes a lost-motion-compensating means, said lost-motion-compensating means being coupled to said lever.